US012130587B2

(12) United States Patent
Isono et al.

(10) Patent No.: US 12,130,587 B2
(45) Date of Patent: Oct. 29, 2024

(54) TONER

(71) Applicant: CANON KABUSHIKI KAISHA, Tokyo (JP)

(72) Inventors: Naoya Isono, Shizuoka (JP); Kenichi Nakayama, Shizuoka (JP); Hirofumi Kyuushima, Shizuoka (JP); Mai Kato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 673 days.

(21) Appl. No.: 17/205,716

(22) Filed: Mar. 18, 2021

(65) Prior Publication Data

US 2021/0318631 A1     Oct. 14, 2021

(30) Foreign Application Priority Data

Mar. 24, 2020   (JP) .................................. 2020-053059

(51) Int. Cl.
*G03G 9/093*     (2006.01)
*C08F 212/08*    (2006.01)
*C08G 63/183*    (2006.01)

(52) U.S. Cl.
CPC ....... *G03G 9/09371* (2013.01); *C08F 212/08* (2013.01); *C08G 63/183* (2013.01); *G03G 9/09321* (2013.01)

(58) Field of Classification Search
CPC ........................ G03G 9/09371; G03G 9/09321
See application file for complete search history.

(56) References Cited

U.S. PATENT DOCUMENTS

| | | |
|---|---|---|
| 4,802,977 A | 2/1989 | Kanda et al. |
| 4,844,349 A | 7/1989 | Kanda et al. |
| 5,016,823 A | 5/1991 | Kato et al. |
| 5,111,998 A | 5/1992 | Kanda et al. |
| 5,270,143 A | 12/1993 | Tomiyama et al. |
| 5,319,424 A | 6/1994 | Tomiyama et al. |
| 5,338,638 A | 8/1994 | Tsuchiya et al. |
| 5,364,720 A | 11/1994 | Nakazawa et al. |
| 5,424,810 A | 6/1995 | Tomiyama et al. |
| 5,447,815 A | 9/1995 | Kato et al. |
| 5,489,498 A | 2/1996 | Ohno et al. |
| 5,712,075 A | 1/1998 | Mitsumura et al. |
| 5,753,396 A | 5/1998 | Nakamura et al. |
| 5,854,365 A | 12/1998 | Ohno et al. |
| 5,928,830 A | 7/1999 | Cheng |
| 5,931,306 A | 8/1999 | Mitsumura et al. |
| 6,207,339 B1 | 3/2001 | Kato et al. |
| 6,316,157 B1 | 11/2001 | Yoshikawa et al. |
| 6,346,356 B1 | 2/2002 | Ohno et al. |
| 7,112,393 B2 | 9/2006 | Komoto et al. |
| 7,153,625 B2 | 12/2006 | Kaburagi et al. |
| 7,241,546 B2 | 7/2007 | Moriki et al. |
| 7,387,860 B2 | 6/2008 | Moriki et al. |
| 7,846,631 B2 | 12/2010 | Katsuta et al. |
| 8,367,289 B2 | 2/2013 | Isono et al. |
| 8,440,382 B2 | 5/2013 | Isono et al. |
| 8,497,054 B2 | 7/2013 | Sugiyama et al. |
| 8,652,737 B2 | 2/2014 | Handa et al. |
| 8,778,581 B2 | 7/2014 | Nonaka et al. |
| 8,822,120 B2 | 9/2014 | Abe et al. |
| 8,828,639 B2 | 9/2014 | Kamikura et al. |
| 8,841,056 B2 | 9/2014 | Yoshizaki et al. |
| 9,158,216 B2 | 10/2015 | Shimano et al. |
| 9,377,705 B2 | 6/2016 | Shimano et al. |
| 9,383,668 B2 | 7/2016 | Noji et al. |
| 9,500,972 B2 | 11/2016 | Tanaka et al. |
| 9,575,424 B2 | 2/2017 | Nakagawa et al. |
| 9,599,919 B2 | 3/2017 | Isono et al. |
| 9,658,549 B2 | 5/2017 | Tanaka et al. |
| 9,690,223 B2 | 6/2017 | Sakamoto |
| 9,785,068 B2 | 10/2017 | Umeda et al. |
| 9,785,071 B2 | 10/2017 | Shimano et al. |
| 9,829,816 B2 | 11/2017 | Tanaka et al. |
| 9,835,964 B2 | 12/2017 | Yoshida et al. |
| 9,904,193 B2 | 2/2018 | Nakagawa et al. |
| 9,921,501 B2 | 3/2018 | Mochizuki et al. |
| 9,958,801 B2 | 5/2018 | Tanaka et al. |
| 10,078,279 B2 | 9/2018 | Nakagawa et al. |
| 10,101,681 B2 | 10/2018 | Tagawa et al. |
| 10,216,107 B2 | 2/2019 | Tsubaki et al. |
| 10,254,673 B2 * | 4/2019 | Tsujihiro ............ G03G 9/09371 |
| 10,747,136 B2 | 8/2020 | Kenmoku et al. |

(Continued)

FOREIGN PATENT DOCUMENTS

| | | |
|---|---|---|
| CN | 104379632 A | 2/2015 |
| CN | 107209465 A | 9/2017 |
| CN | 110597033 A | 12/2019 |
| JP | 60-241056 A | 11/1985 |
| JP | 6-110250 A | 4/1994 |
| JP | 2015-11077 A | 1/2015 |
| JP | 2015-45844 A | 3/2015 |
| JP | 2015-141221 A | 8/2015 |
| JP | 2016-21060 A | 2/2016 |
| JP | 2017-44743 A | 3/2017 |
| JP | 2017-44952 A | 3/2017 |
| JP | 2017-116712 A | 6/2017 |

OTHER PUBLICATIONS

U.S. Appl. No. 17/217,074, Yoshiaki Shiotari, filed Mar. 30, 2021.

*Primary Examiner* — Peter L Vajda
*Assistant Examiner* — Boone Alexander Evans
(74) *Attorney, Agent, or Firm* — VENABLE LLP

(57) ABSTRACT

The toner includes a toner particle that comprising a core particle containing a resin component and a shell on a surface of the core particle, wherein the resin component comprises more than 50.0 mass % of a polyester resin comprising a monomer unit that contains a heterocyclic group, and the shell comprises at least one resin selected from the group consisting of prescribed (meth)acrylic resins and melamine resins.

6 Claims, No Drawings

(56) References Cited

U.S. PATENT DOCUMENTS

| | | |
|---|---|---|
| 10,948,839 B2 | 3/2021 | Tsubaki et al. |
| 2010/0035171 A1 | 2/2010 | Watanabe et al. |
| 2010/0203439 A1 | 8/2010 | Zhou |
| 2015/0004540 A1 | 1/2015 | Ozawa |
| 2015/0152219 A1* | 6/2015 | Tamura ................ C08G 63/78 |
| | | 528/296 |
| 2015/0248072 A1 | 9/2015 | Katsuta |
| 2016/0179025 A1* | 6/2016 | Nakagawa ........... G03G 9/0935 |
| | | 430/110.2 |
| 2017/0123333 A1 | 5/2017 | Kuroki et al. |
| 2018/0024453 A1 | 1/2018 | Tsujihiro |
| 2019/0384196 A1 | 12/2019 | Kamae et al. |
| 2020/0133151 A1 | 4/2020 | Isono et al. |
| 2020/0292953 A1 | 9/2020 | Nakayama et al. |
| 2020/0292956 A1 | 9/2020 | Amano et al. |
| 2020/0363742 A1 | 11/2020 | Kyuushima et al. |

* cited by examiner

TONER

BACKGROUND OF THE INVENTION

Field of the Invention

The present disclosure relates to a toner used to form a toner image by the development of an electrostatic latent image formed by a method, e.g., electrophotography, electrostatic recording methods, and toner jet system recording methods.

Description of the Related Art

In recent years, the electrophotographic technology used in, e.g., copier, printer, and facsimile receiving devices, has been subjected to increasingly severe requirements from users due to the further development of these devices. There has been strong demand in recent years for the ability to carry out favorable quality printing on a long-term basis while using a compact design.

From the perspective of compact design, efforts have been made, for example, to achieve downsizing through a simplification or streamlining of the fixing member, i.e., a hot roller or film that effects fixing of a toner image to a transfer material. This approach requires that fixing be made possible while heating the fixing member as little as possible, and as a consequence a low-melting release agent or a binder resin having a low melting point or glass transition point has frequently been used in order to produce a toner having an excellent low-temperature fixability. Due to this, when such a toner is stored at high temperatures, the facile occurrence of toner-to-toner melt-bonding has been a problem.

In response to this problem, for example, Japanese Patent Application Laid-open Publication No. 2015-045844 discloses a core-shell toner that uses, in a shell layer thereof, a thermosetting resin and a thermoplastic resin.

SUMMARY OF THE INVENTION

However, from the perspective of enabling favorable quality printing on a long-term basis, when repetitive printing is continued using the abovementioned toner, the shell of the core-shell toner may end up debonding from the core. As a result, disturbances occur in chargeability and in addition the debonded shell and the exposed core may cause contamination of or melt-bonding to, for example, a developing member and a charging member, and image defects may be then ultimately caused. That is, it has been found that a core-shell toner such as the aforementioned is problematic with regard to its durability.

Improvements in the properties of toners are still required in order to provide an image forming apparatus capable of favorable quality printing on a long-term basis while having a compact design required in the market.

The present disclosure provides a toner that exhibits an improved core/shell adhesiveness and is resistant to debonding of the shell even during long-term use, and that has an excellent long-term developing performance.

A toner comprising a toner particle comprising
a core particle containing a resin component and
a shell on a surface of the core particle, wherein
the resin component comprises more than 50.0 mass % of
a polyester resin comprising a monomer unit represented by formula (1) below, and
the shell comprises at least one resin selected from the group consisting of (A) and (B) below:

(A) (meth)acrylic resins that comprises at least one monomer unit selected from the group consisting of formulas (2) and (3) below;
(B) melamine resins
in formula (1), $R^1$ represents a heterocyclic group comprising at least one heteroatom selected from the group consisting of oxygen, nitrogen, and sulfur,
in formula (2), $R^2$ represents a hydrogen atom or methyl group,
in formula (3), $R^3$ represents a hydrogen atom or methyl group and $R^4$ represents an alkylene group having from 1 to 3 carbons.

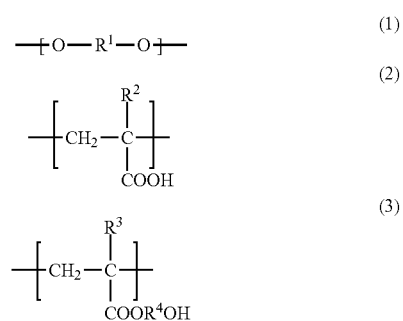

The present invention provides a toner that exhibits an improved core/shell adhesiveness and is resistant to debonding of the shell even during long-term use, and that has an excellent long-term developing performance.

Further features of the present invention will become apparent from the following description of exemplary embodiments.

DESCRIPTION OF THE EMBODIMENTS

In the present disclosure, the notations "from XX to YY" and "XX to YY" representing a numerical range denote, unless otherwise stated, a numerical value range that includes the lower limit and the upper limit thereof, as endpoints. In a case where numerical value ranges are described in stages, the upper limits and the lower limits of the respective numerical value ranges can be combined arbitrarily.

In the present disclosure, "(meth)acrylate ester" means acrylate ester and/or methacrylate ester. The "monomer unit" refers to the reacted form of the monomer substance in the polymer.

The present inventors discovered that the core particle/shell adhesiveness is improved and that shell debonding is suppressed even during long-term use, through the use of a core particle for which the main component is a polyester resin having a prescribed component and through the use of a shell having a prescribed component.

Specifically, for a toner that has a toner particle having a binder resin-containing core particle and having a shell on the surface of the core particle, the resin component of the core particle must contain more than 50.0 mass %, in said resin component, of a polyester resin that has a monomer unit represented by formula (1). The monomer unit given by formula (1) is a monomer unit of a condensation polymerized heterocyclic diol.

In addition, the shell has at least one resin selected from the group consisting of the following (A) and (B).

(A) (meth)acrylic resins that have at least one monomer unit selected from the group consisting of formula (2) and formula (3)
(B) melamine resins

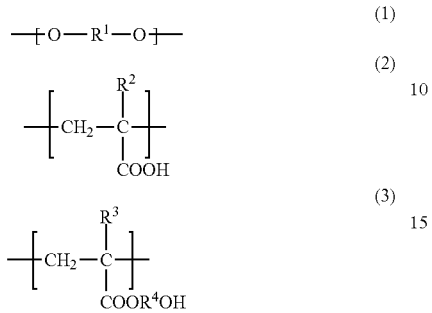

(1)

(2)

(3)

in formula (1), $R^1$ represents a heterocyclic group comprising at least one heteroatom selected from the group consisting of oxygen, nitrogen, and sulfur, in formula (2), $R^2$ represents a hydrogen atom or methyl group, in formula (3), $R^3$ represents a hydrogen atom or methyl group and $R^4$ represents an alkylene group having from 1 to 3 (more preferably 2 or 3) carbons.

The detailed mechanism is thought by the present inventors to be as follows. When a polyester resin having a monomer unit derived from a heterocyclic diol with formula (1) is used in the resin component of the core particle, polarization is generated by the heteroatom in the heterocyclic structure and the polyester resin has a high polarity. It is also thought that because formula (1) is a rigid cyclic structure, exposure of the highly polar heteroatom to the core particle/shell interface is facilitated.

When the aforementioned (meth)acrylic resin or a melamine resin is used for the shell, these resins form hydrogen bonds with the heteroatom in the resin component of the core particle and the adhesiveness between the core particle and shell is enhanced due to the intermolecular interaction.

A suppression of shell debonding, even during long-term use, is made possible as a result. Due to this suppression of shell debonding, a toner is obtained that exhibits an excellent durability that enables the developing defects of fogging and streak to also be suppressed on a long-term basis.

The resin component of the core particle contains more than 50.0 mass %, in the resin component of the core particle, of a polyester resin that has a monomer unit represented by formula (1).

When the content resides in this range, the core particle/shell adhesiveness is enhanced and shell debonding is suppressed even during long-term use. At least 55.0 mass % is more preferred and at least 60.0 mass % is even more preferred.

The upper limit is not particularly limited, but is preferably not more than 100.0 mass %, more preferably not more than 98.0 mass %, and still more preferably not more than 95.0 mass %.

The content in the polyester resin of the heterocyclic diol-derived monomer unit with formula (1) is preferably from 5.0 mass % to 35.0 mass %. When this range is observed, the intermolecular interaction required for core particle/shell adhesiveness is obtained to a satisfactory degree, while the glass transition temperature of the resin is adjusted to a suitable temperature. From 20.0 mass % to 35.0 mass % is more preferred.

Heterocyclic diol that can form the monomer unit with formula (1) can be exemplified by spiroglycol and isosorbide and their derivatives. Preferred thereamong are isosorbide and its alkylene oxide adducts. When isosorbide or an alkylene oxide adduct thereof is used, the charge rise performance is excellent and suppression of initial fogging is facilitated.

$R^1$ is preferably an oxygen-containing heterocyclic group. In addition, the monomer unit with formula (1) is more preferably represented by at least one selection from the group consisting of the following formulas (1-2) and (1-3) and is still more preferably represented by the following formula (1-2).

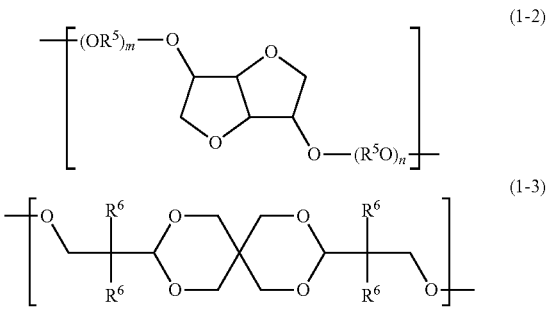

(1-2)

(1-3)

In formula (1-2), each $R^5$ independently represents a straight-chain or branched alkylene group having from 2 to 8 (more preferably 2 or 3) carbons. m and n are each independently 0 or an integer from 1 to 5, and m n satisfies from 0 to 10. m and n are more preferably 0. In formula (1-3), each $R^6$ independently represents a hydrogen atom or methyl group.

In addition to the monomer unit with formula (1), the polyester resin preferably contains at least one selection from the group consisting of structures in which an aliphatic diol is condensation polymerized with a carboxylic acid component (preferably a dicarboxylic acid or tricarboxylic acid) and structures in which an alicyclic diol is condensation polymerized with a carboxylic acid component (preferably a dicarboxylic acid or tricarboxylic acid), and the polyester resin more preferably contains a structure in which an aliphatic diol is condensation polymerized with a carboxylic acid component.

The aliphatic diol is exemplified by at least one selection from the group consisting of, e.g., ethylene glycol, diethylene glycol, triethylene glycol, 1,2-propylene glycol, 1,3-propylene glycol, 1,4-cyclohexanedimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, and 2-methyl-1,2,4-butanetriol.

The alicyclic diol is exemplified by at least one selection from the group consisting of, e.g., 1,2-cyclohexanediol, 1,3-cyclohexanediol, 1,4-cyclohexanediol, 1,4-cyclohexanedimethanol, 4-(2-hydroxyethyl)cyclohexanol, 4-(hydroxymethyl)cyclohexanol, 4,4'-bicyclohexanol, 2-cyclohexene-1,4-diol, 4-cyclohexene-1,2-dimethanol, 5-norbornene-2,3-dimethanol, and 5-norbornene-2,3-diol.

The acid monomer is exemplified by aromatic dicarboxylic acids such as phthalic acid, isophthalic acid, and terephthalic acid, and their anhydrides; alkyl dicarboxylic acids such as succinic acid, adipic acid, sebacic acid, and azelaic acid, and their anhydrides; succinic acid substituted by an alkyl group or alkenyl group having from 6 to 18 carbons, and anhydrides thereof; and unsaturated dicarboxylic acids such as fumaric acid, maleic acid, and citraconic acid, and their anhydrides.

Among the preceding, for example, polybasic carboxylic acids, e.g., terephthalic acid, succinic acid, adipic acid, fumaric acid, trimellitic acid, pyromellitic acid, benzophenonetetracarboxylic acid, and their anhydrides, are preferred for use as the acid monomer component. The weight-average molecular weight Mw of the polyester resin is preferably from 20,000 to 100,000.

The toner particle has a shell on the surface of the core particle. The shell need not cover the entire core particle, and the core particle may be partially exposed at the toner particle surface.

Melamine resin and/or a (meth)acrylic resin having at least one monomer unit selected from the group consisting of formula (2) and formula (3) must be used for the shell in order to enhance the adhesiveness between the shell and the resin component of the core particle through the interaction described above.

The shell more preferably is a (meth)acrylic resin having at least one monomer unit selected from the group consisting of formula (2) and formula (3).

The melamine resin preferably is at least one selection from the group consisting of methylolmelamine resins, hexamethylolmelamine resins, and methoxymethylolmelamine resins. The melamine resin more preferably is a hexamethylolmelamine resin.

Acrylic acid and methacrylic acid are the (meth)acrylic monomers that form the monomer unit with formula (2). Preferred examples of the (meth)acrylic monomer that forms the monomer unit with formula (3) are 2-hydroxyethyl acrylate, 2-hydroxyethyl methacrylate, 2-hydroxypropyl acrylate, and 2-hydroxypropyl methacrylate.

The (meth)acrylic resin has a monomer unit provided by the reaction of (meth)acrylic acid and/or a (meth)acrylate ester. The (meth)acrylic resin is not limited to (meth)acrylic acid and (meth)acrylate esters, and monomer having an ethylenically unsaturated bond can be used.

A radically copolymerizable monomer other than the monomer indicated above may also be used in combination therewith for the shell resin.

Examples are as follows: styrene and styrene derivatives, e.g., α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene; acrylate ester monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, and benzyl acrylate; and methacrylate ester monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, and n-nonyl methacrylate.

A di(meth)acrylate such as ethylene glycol di(meth)acrylate, 1,3-butanediol di(meth)acrylate, and 1,6-hexanediol di(meth)acrylate may also be used.

Styrene is preferred among the preceding. That is, the (meth)acrylic resin preferably is a styrene-(meth)acrylic resin having as a constituent component a monomer unit provided by the reaction of styrene.

The total content in the (meth)acrylic resin of the at least one monomer unit selected from the group consisting of formula (2) and formula (3) is preferably from 5.0 mass % to 35.0 mass %. When this total content is in the indicated range, the charging characteristics are excellent and the intermolecular interaction required for core particle/shell adhesiveness is obtained to a satisfactory degree. From 10.0 mass % to 25.0 mass % is more preferred.

The shell content is preferably from 0.5 mass parts to 3.0 mass parts per 100.0 mass parts of the resin component in the core particle. When the shell content is in the indicated range, there is no shell-induced impairment of the fixing performance and the storage stability is excellent. From 0.7 mass parts to 2.5 mass parts is more preferred and from 0.7 mass parts to 1.5 mass parts is still more preferred.

Resin Component of Core Particle

An additional resin may also be used for the resin component of the core particle as long as the resin component of the core particle contains more than 50.0 mass % of the polyester resin having the monomer unit with the formula (1) indicated above.

For example, the following resins may be used.

The resins can be exemplified by the following: homopolymers of styrene and its substituted forms, e.g., polystyrene, poly-p-chlorostyrene, and polyvinyltoluene; styrene copolymers, e.g., styrene-p-chlorostyrene copolymer, styrene-vinyltoluene copolymer, styrene-vinylnaphthalene copolymer, styrene-acrylate ester copolymers, styrene-methacrylate ester copolymers, styrene-methyl α-chloromethacrylate copolymer, styrene-acrylonitrile copolymer, styrene-vinyl methyl ether copolymer, styrene-vinyl ethyl ether copolymer, styrene-vinyl methyl ketone copolymer, and styrene-acrylonitrile-indene copolymer; as well as polyvinyl chloride, phenolic resins, natural resin-modified phenolic resins, natural resin-modified maleic acid resins, acrylic resins, methacrylic resins, polyvinyl acetate, silicone resins, amorphous polyester, crystalline polyester, polyurethane resins, polyamide resins, furan resins, epoxy resins, xylene resins, polyvinyl butyral, terpene resins, coumarone-indene resins, and petroleum resins.

The resin component of the core particle preferably contains a styrene-acrylic resin such as a styrene-acrylate ester copolymer, styrene-methacrylate ester copolymer, and so forth.

The aforementioned styrene derivatives, acrylate ester monomers, and methacrylate ester monomers can be used in the styrene-acrylic resin. The aforementioned diacrylates may also be used.

The content of the styrene-acrylic resin in the resin component of the core particle is preferably at least 2.0 mass % but less than 50.0 mass % and is more preferably from 5.0 mass % to 45.0 mass %.

Colorant

The toner particle preferably contains a colorant. The colorant can be exemplified by the following.

The black colorant can be exemplified by carbon black and by colorants provided by color mixing using a yellow colorant, magenta colorant, and cyan colorant to give a black color. A pigment may be used by itself for the colorant; however, the use of a dye/pigment combination brings about an improved sharpness and is thus more preferred from the standpoint of the quality of the full-color image.

Magenta-colored pigments can be exemplified by the following: C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C. I. Pigment Violet 19; and C. I. Vat Red 1, 2, 10, 13, 15, 23, 29, and 35.

Magenta-colored dyes can be exemplified by the following: oil-soluble dyes such as C. I. Solvent Red 1, 3, 8, 23, 24, 25, 27, 30, 49, 81, 82, 83, 84, 100, 109, and 121; C. I. Disperse Red 9; C. I. Solvent Violet 8, 13, 14, 21, and 27; and C. I. Disperse Violet 1, and by basic dyes such as C. I. Basic Red 1, 2, 9, 12, 13, 14, 15, 17, 18, 22, 23, 24, 27, 29, 32, 34, 35, 36, 37, 38, 39, and 40 and C. I. Basic Violet 1, 3, 7, 10, 14, 15, 21, 25, 26, 27, and 28.

Cyan-colored pigments can be exemplified by the following: C. I. Pigment Blue 2, 3, 15:2, 15:3, 15:4, 16, and 17; C. I. Vat Blue 6; C. I. Acid Blue 45; and copper phthalocyanine pigments in which 1 to 5 phthalimidomethyl groups are substituted on the phthalocyanine skeleton.

Cyan-colored dyes can be exemplified by C. I. Solvent Blue 70.

Yellow-colored pigments can be exemplified by the following: C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185, and C. I. Vat Yellow 1, 3, and 20.

Yellow-colored dyes can be exemplified by C. I. Solvent Yellow 162.

The amount of use of the colorant is preferably from 0.1 mass parts to 30 mass parts per 100.0 mass parts of the binder resin.

Wax

The toner particle preferably contains a wax. There are no particular limitations on the wax, but it can be exemplified by the following: hydrocarbon waxes such as low molecular weight polyethylene, low molecular weight polypropylene, alkylene copolymers, microcrystalline wax, paraffin wax, and Fischer-Tropsch waxes; oxides of hydrocarbon waxes, such as oxidized polyethylene wax, and their block copolymers; waxes in which the major component is fatty acid ester, such as carnauba wax; and waxes provided by the partial or complete deacidification of fatty acid esters, such as deacidified carnauba wax.

Additional examples are as follows: saturated straight-chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohols, behenyl alcohol, carnaubyl alcohol, ceryl alcohol, and melissyl alcohol; polyhydric alcohols such as sorbitol; esters between a fatty acid such as palmitic acid, stearic acid, behenic acid, or montanic acid and an alcohol such as stearyl alcohol, aralkyl alcohol, behenyl alcohol, carnaubyl alcohol, ceryl alcohol, or melissyl alcohol; fatty acid amides such as linoleamide, oleamide, and lauramide; saturated fatty acid bisamides such as methylenebisstearamide, ethylenebiscapramide, ethylenebislauramide, and hexamethylenebisstearamide; unsaturated fatty acid amides such as ethylenebisoleamide, hexamethylenebisoleamide, N,N'-dioleyladipamide, and N,N'-dioleylsebacamide; aromatic bisamides such as m-xylenebisstearamide and N,N'-distearylisophthalamide; fatty acid metal salts (generally known as metal soaps) such as calcium stearate, calcium laurate, zinc stearate, and magnesium stearate; waxes provided by grafting an aliphatic hydrocarbon wax using a vinyl monomer such as styrene or acrylic acid; partial esters between a fatty acid and a polyhydric alcohol, such as behenyl monoglyceride; and hydroxyl group-containing methyl ester compounds obtained by the hydrogenation of plant oils.

Among these waxes, ester waxes and hydrocarbon waxes, e.g., paraffin waxes, Fischer-Tropsch waxes, and so forth, are preferred from the standpoint of improving the low-temperature fixability and the resistance to wraparound during fixing.

The content of the wax is preferably from 0.5 mass parts to 25.0 mass parts per 100.0 mass parts of the binder resin.

Viewed from the standpoint of the coexistence of the toner storage stability with its high temperature offset resistance, the peak temperature of the maximum endothermic peak for the wax that is present in the temperature range from 30° C. to 200° C. in the endothermic curve during ramp up as measured with a differential scanning calorimeter (DSC) is preferably from 50° C. to 110° C.

Charge Control Agent

A charge control agent may also be incorporated in the toner on an optional basis. A known charge control agent can be used for the charge control agent. The charge control agent may be internally added or externally added to the toner particle. The amount of charge control agent addition is preferably from 0.2 mass parts to 10.0 mass parts per 100.0 mass parts of the binder resin.

The toner may be used in the form of a one-component developer. From the standpoint of obtaining a stable image on a long-term basis, the toner may be used mixed with a magnetic carrier as a two-component developer.

Carrier

A known magnetic carrier such as the following can be used for the magnetic carrier here: magnetic bodies, e.g., surface-oxidized iron powder; nonoxidized iron powder; metal particles such as those of iron, lithium, calcium, magnesium, nickel, copper, zinc, cobalt, manganese, and rare earths, as well as their alloy particles, oxide particles, and ferrites, and also magnetic body-dispersed resin carriers (referred to as resin carriers) containing a magnetic body and a binder resin that holds this magnetic body in a dispersed state.

When the toner is mixed with a magnetic carrier and used as a two-component developer, excellent results are generally obtained when the carrier mixing ratio in this case, expressed as the toner concentration in the two-component developer, is preferably from 2 mass % to 15 mass % and is more preferably from 4 mass % to 13 mass %.

The method for producing the toner particle may be a known production method, e.g., an emulsion aggregation method, pulverization, dissolution suspension method, and so forth, but is not otherwise particularly limited.

A production method using pulverization is described in the following. In the pulverization, the resin component is mixed with any optional components, e.g., colorant, wax, and charge control agent, followed by subjecting the resulting mixture to melt-kneading. The obtained melt-kneaded material is subjected to pulverization and classification to obtain a core particle having a desired particle diameter.

The shell that coats the core particle is preferably formed by the addition of the shell-forming material to an aqueous solution. The shell-forming material is preferably added in the form of a dispersion of resin particles.

After the addition of the core particles to an aqueous medium, the core particles are dispersed in the aqueous medium. The method for bringing about this dispersion can be exemplified by methods in which the core particles are mechanically dispersed in the aqueous medium using a device capable of strongly stirring the dispersion, and by methods in which the core particles are dispersed in an aqueous medium that contains a dispersant. Methods that use a dispersant, because they yield a uniform dispersion of the core particles in the aqueous medium, are advantageous in terms of facilitating shell formation without the core particle surface being exposed.

The device capable of strongly stirring the dispersion is preferably a device such as a HIVIS MIX (PRIMIX Corporation).

The shell can be formed by adding the shell-forming material and attaching the shell-forming material to the core particle and raising the temperature. The temperature during shell layer formation is preferably from 65° C. to 95° C. and more preferably from 70° C. to 90° C. By carrying out shell layer formation at temperatures within this range, unification between and among the toner particles that are formed is suppressed while shell layer formation proceeds well.

After shell formation proceeding as described above, a toner particle dispersion can be obtained by cooling the dispersion containing the shell-coated core particles to normal temperature. The toner particle is then obtained as necessary proceeding through a washing step of washing the toner particle and a drying step of drying the toner particle.

The weight-average particle diameter of the toner particle is preferably from 4.0 μm to 8.0 μm.

This toner particle may be used as such as a toner. As necessary, an external additive may be attached to the toner particle surface, and this may then be used as a toner. In a preferred method, the toner particle is mixed with the external additive using a mixer such as an FM mixer (Nippon Coke & Engineering Co., Ltd.), with adjustment of the conditions to avoid embedding the external additive in the toner particle surface.

The methods for measuring the various properties are described in the following.

Identification of Resins Present in Core and Shell

The compositions and ratios of the constituent compounds of the resins present in the core and shell are identified using a pyrolysis gas chromatography-mass spectrometer (also denoted as "pyrolysis GC/MS" in the following) and NMR. When a resin present in the core or shell can be acquired as such, this may also be measured as such.

Pyrolysis GC/MS is used for analysis of the species of the constituent compounds of the resins. The species of the constituent compounds is identified by analysis of the mass spectrum of the components in the resin pyrolyzate that is produced when the resin is pyrolyzed at 550° C. to 700° C. The specific measurement conditions are provided below.

Measurement Conditions for Pyrolysis GC/MS

Pyrolysis device: JPS-700 (Japan Analytical Industry Co., Ltd.)
    Pyrolysis temperature: 590° C.
    GC/MS instrument: Focus GC/ISQ (Thermo Fisher)
    Column: HP-SMS, length of 60 m, inner diameter of 0.25 mm, film thickness of 0.25 μm
    Injection port temperature: 200° C.
    Flow pressure: 100 kPa
    Split: 50 mL/min
    MS ionization: EI
    Ion source temperature: 200° C. Mass Range 45 to 650

The occurrence ratios of the identified constituent compounds of the resins are then measured and calculated using solid-state $^1$H-NMR. Structural determination is performed using nuclear magnetic resonance spectroscopic analysis ($^1$H-NMR) [400 MHz, CDCl$_3$, room temperature (25° C.)].

Measurement device: JNM-EX400 FT-NMR instrument (JEOL Ltd.)
    Measurement frequency: 400 MHz
    Pulse condition: 5.0 μs
    Frequency range: 10,500 Hz
    Cumulative number: 1024

The molar ratios for the individual monomer components are determined from the integration values in the obtained spectrum and the compositional ratios (mass %) are calculated based on these.

Method for Measuring Weight-Average Particle Diameter (D4) of Toner Particle

The weight-average particle diameter (D4) of the toner particle is determined by carrying out the measurements in 25,000 channels for the number of effective measurement channels and performing analysis of the measurement data, using a "Coulter Counter Multisizer 3" (registered trademark, Beckman Coulter, Inc.), a precision particle size distribution measurement instrument operating on the pore electrical resistance method and equipped with a 100 μm aperture tube, and using the accompanying dedicated software, i.e., "Beckman Coulter Multisizer 3 Version 3.51" (Beckman Coulter, Inc.), to set the measurement conditions and analyze the measurement data.

The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used.

The dedicated software is configured as follows prior to measurement and analysis. In the "modify the standard operating method (SOM)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the threshold value/noise level measurement button. In addition, the current is set to 1,600 μA; the gain is set to 2; the electrolyte solution is set to ISOTON II; and a check is entered for the post-measurement aperture tube flush.

In the "setting conversion from pulses to particle diameter" screen of the dedicated software, the bin interval is set to logarithmic particle diameter; the particle diameter bin is set to 256 particle diameter bins; and the particle diameter range is set to from 2 μm to 60 μm.

The specific measurement procedure is as follows.
(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.
(2) Approximately 30 mL of the aqueous electrolyte solution is introduced into a 100-mL flatbottom glass beaker. To this is added approximately 0.3 mL of the following dilution as a dispersant.
Dilution: dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.)
(3) A prescribed amount of deionized water is introduced into the water tank of the ultrasound disperser indicated below, which has an electrical output of 120 W and is equipped with two oscillators (oscillation frequency=50 kHz) disposed such that the phases are displaced by 180°, and approximately 2 mL of Contaminon N is added to this water tank.
Ultrasound disperser: "Ultrasonic Dispersion System Tetora 150" (Nikkaki Bios Co., Ltd.)
(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.
(5) While the aqueous electrolyte solution within the beaker set up according to (4) is being irradiated with ultrasound, approximately 10 mg of the toner is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 15° C. to 40° C.
(6) Using a pipette, the dispersed toner-containing aqueous electrolyte solution prepared in (5) is dripped into the roundbottom beaker set in the sample stand as described in (1) with adjustment to provide a measurement concentration of approximately 5%. Measurement is then performed until the number of measured particles reaches 50,000.
(7) The measurement data is analyzed by the dedicated software provided with the instrument and the weight-average particle diameter (D4) is calculated. When set to graph/volume % with the dedicated software, the "average diameter" on the analysis/volumetric statistical value (arithmetic average) screen is the weight-average particle diameter (D4).

EXAMPLES

The present invention is more specifically described herebelow using examples. The present invention is not limited by the examples that follow. The number of parts in the examples and comparative examples is on a mass basis in all instances unless specifically indicated otherwise.

Production of Core Particle Polyester Resin 1

100.0 parts of terephthalic acid, 23.1 parts of trimellitic anhydride, 11.7 parts of adipic acid, 70.4 parts of isosorbide, and 42.8 parts of 1,3-propanediol were added to a reactor fitted with a stirrer, thermometer, nitrogen introduction line, water separation line, and pressure-reduction apparatus and were heated to 130° C. while stirring.

0.5 parts of titanium(IV) isopropoxide was added as esterification catalyst, after which the temperature was raised to 160° C. and a condensation polymerization was run over 5 hours. The temperature was then raised to 180° C. and a reaction was run under reduced pressure until the desired molecular weight was reached to yield polyester resin 1. The weight-average molecular weight Mw of polyester resin 1 was 50,000.

Production of Core Particle Polyester Resins 2 to 8

Polyester resins 2 to 8 were prepared using the same production method as for polyester resin 1, but changing the starting materials as shown in Table 1.

TABLE 1

| Polyester resin No. | 1 | 2 | 3 | 4 | 5 | 6 | 7 | 8 |
|---|---|---|---|---|---|---|---|---|
| Acid monomer 1 | terephthalic acid | terephthalic acid | terephthalic acid | terephthalic acid | terephthalic acid | terephthalic acid | terephthalic acid | terephthalic acid |
| Mass parts | 100.0 | 150.0 | 130.0 | 105.0 | 100.0 | 85 | 75.0 | 85 |
| Molar ratio | 75.0 | 100.0 | 90.0 | 80.0 | 80.0 | 75.0 | 75.0 | 90.0 |
| Acid monomer 2 | trimellitic anhydride | trimellitic anhydride | trimellitic anhydride | trimellitic anhydride | trimellitic anhydride | trimellitic anhydride | trimellitic anhydride | trimellitic anhydride |
| Mass parts | 23.1 | 8.7 | 16.7 | 22.8 | 21.7 | 19.7 | 17.3 | 16.4 |
| Molar ratio | 15.0 | 5.0 | 10.0 | 15.0 | 15.0 | 15.0 | 15.0 | 15.0 |
| Acid monomer 3 | adipic acid | adipic acid | — | — | — | adipic acid | adipic acid | — |
| Mass parts | 11.7 | 13.2 | — | — | — | 10 | 8.8 | — |
| Molar ratio | 10.0 | 10.0 | — | — | — | 10.0 | 10.0 | — |
| Alcohol monomer 1 | isosorbide | isosorbide | isosorbide | isosorbide | isosorbide | spiroglycol | spiroglycol | BPA |
| Mass parts | 70.4 | 13.2 | 10.2 | 80.8 | 93.5 | 66.5 | 58.6 | 123.3 |
| Molar ratio | 60.0 | 10.0 | 8.0 | 70.0 | 85.0 | 32.0 | 32.0 | 95.0 |
| Alcohol monomer 2 | 1,3-propanediol | 1,3-propanediol | 1,3-propanediol | 1,3-propanediol | 1,3-propanediol | 1,3-propanediol | BPA | ethylene glycol |
| Mass parts | 42.8 | 68.7 | 64.8 | 24.0 | 17.2 | 51.9 | 44.0 | 14.1 |
| Molar ratio | 70.0 | 100.0 | 98.0 | 40.0 | 30.0 | 100.0 | 32.0 | 40.0 |
| Alcohol monomer 3 | — | — | ethylene glycol | — | — | — | 1,3-propanediol | — |
| Mass parts | — | — | 8.6 | — | — | — | 27.5 | — |
| Molar ratio | — | — | 16.0 | — | — | — | 60 | — |

TABLE 1-continued

| Polyester resin No. | 1 | 2 | 3 | 4 | 5 | 6 | 7 | 8 |
|---|---|---|---|---|---|---|---|---|
| Amount of formula (1) (mass %) | 28.4 | 5.2 | 4.4 | 34.7 | 40.2 | 28.5 | 25.4 | 0 |

The "amount of formula (1)" in the table indicates the content of monomer unit with formula (1) in the polyester resin.

Production of Core Particle Styrene-Acrylic Resin 80.0 parts of styrene, 20.0 parts of n-butyl acrylate, and 0.3 parts of hexanediol diacrylate were added to a reactor fitted with a stirrer, thermometer, and nitrogen introduction line and were heated to a temperature of 80° C. while stirring.

2.0 parts of Perbutyl O (10-hour half-life temperature of 72.1° C. (NOF Corporation)) was then added as polymerization initiator and a polymerization was run for 5 hours to obtain a styrene-acrylic resin for use for the core particle.

Production of Shell Resin 1

62.8 parts of styrene, 20.9 parts of 2-hydroxyethyl methacrylate, 15.5 parts of n-butyl acrylate, and 0.8 parts of ethylene glycol dimethacrylate were added to and dispersed into an aqueous solution of 3.0 parts of the surfactant Neogen RK (Dai-ichi Kogyo Seiyaku Co., Ltd.) dissolved in 50 parts of deionized water.

An aqueous solution of 0.3 parts of potassium persulfate dissolved in 10 parts of deionized water was also added while gently stirring for 10 minutes. After nitrogen substitution had been carried out, an emulsion polymerization was run for 6 hours at 70° C. After the completion of polymerization, the reaction solution was cooled to room temperature and deionized water was added to yield an aqueous dispersion of shell resin 1 having a solids concentration of 50.0 mass % (shell resin 1 dispersion).

Shell Resins 2 to 6 Production Example

Shell resins 2 to 6 were obtained proceeding as in the production example for shell resin 1, but changing the monomer composition as indicated in Table 2.

TABLE 2

|  | Shell Resin 1 | Shell Resin 2 | Shell Resin 3 | Shell Resin 4 | Shell Resin 5 | Shell Resin 6 |
|---|---|---|---|---|---|---|
| Monomer 1 | styrene | styrene | styrene | styrene | styrene | styrene |
| Mass parts | 62.8 | 77.0 | 77.3 | 55.6 | 50.8 | 79.6 |
| Molar ratio | 75.0 | 75.0 | 75.6 | 56.0 | 51.0 | 83.0 |
| Monomer 2 | 2-HEMA | ethyl acrylate | ethyl acrylate | 2-HEMA | 2-HEMA | n-butyl acrylate |
| Mass parts | 20.9 | 16.8 | 17.3 | 25.5 | 27.8 | 19.5 |
| Molar ratio | 20.0 | 17.0 | 17.6 | 23.0 | 25.0 | 16.5 |
| Monomer 3 | n-butyl acrylate | acrylic acid | acrylic acid | ethyl acrylate | ethyl acrylate | MMA-EG |
| Mass parts | 15.5 | 5.3 | 4.5 | 9.1 | 8.1 | 0.9 |
| Molar ratio | 15.0 | 7.5 | 6.3 | 9.5 | 8.5 | 0.5 |
| Monomer 4 | MMA-EG | MMA-EG | MMA-EG | methacrylic acid | methacrylic acid | — |
| Mass parts | 0.8 | 1.0 | 1.0 | 9.0 | 12.4 | — |
| Molar ratio | 0.5 | 0.5 | 0.5 | 11.0 | 15.0 | — |
| Monomer 5 | — | — | — | MMA-EG | MMA-EG | — |
| Mass parts | — | — | — | 0.9 | 0.9 | — |
| Molar ratio | — | — | — | 0.5 | 0.5 | — |
| Amount of formulas (2) and (3) (mass %) | 20.9 | 5.3 | 4.5 | 34.5 | 40.1 | 0 |

In the table, the "amount of formulas (2) and (3)" indicates the total content of the at least one monomer unit selected from the group consisting of formula (2) and formula (3). The following abbreviations are also used.

2-HEMA: 2-hydroxyethyl methacrylate
MMA-EG: ethylene glycol dimethacrylate

Toner 1 Production
Core Particle 1 Production
  polyester resin 1: 90.0 parts
  styrene-acrylic resin for core particle: 10.0 parts
  C.I. Pigment Blue 15:3 (copper phthalocyanine): 5.0 parts
  ester wax (behenyl behenate:melting point=72° C.): 15.0 parts
  Fischer-Tropsch wax (C105, Sasol Limited, melting point: 105° C.): 2.0 parts These materials were preliminarily mixed using a Mitsui Henschel mixer (Mitsui Miike Chemical Engineering Machinery Co., Ltd.), followed by melt-kneading using a twin-screw extruder (product name: PCM-30, Ikegai Ironworks Corporation) with the temperature set to provide a temperature for the melted material at the outlet of 140° C.

The resulting kneaded material was cooled and coarsely pulverized using a hammer mill and was then pulverized using a pulverizer (product name: Turbo Mill T250, Turbo Kogyo Co., Ltd.). The resulting finely pulverized powder was classified using a Coanda effect-based multi-division classifier to yield a core particle 1 having a weight-average particle diameter (D4) of 6.8 μm.

Toner Particle 1 Production

An aqueous medium was prepared by adding 1.8 parts of tricalcium phosphate to 250.0 parts of deionized water heated to a temperature of 40° C. and stirring at a stirring rate of 15,000 rpm using a TK Homomixer (Tokushu Kika Kogyo Co., Ltd.).

A core particle 1 slurry was prepared by adding 100.0 parts of core particle 1 to the aqueous medium. 2.0 parts of the shell resin 1 dispersion having a solids concentration of 50.0 mass % was then added in order to add 1.0 parts of shell resin 1 per 100.0 parts of core particle 1, and a shell layer was formed on the core particle surface by heating to 75° C. and holding for 2 hours.

After cooling to room temperature, the calcium phosphate dispersant was dissolved by the addition of hydrochloric acid, and filtration, washing with water, and drying then gave a toner particle 1 having a core-shell structure and having a weight-average particle diameter (D4) of 6.8 μm.

Toner 1 Production 100.0 parts of toner particle 1 was mixed for 3 minutes with 1.5 parts of dry silica particles ("AEROSIL (registered trademark) REA90", positive-charging hydrophobed silica particles, Nippon Aerosil Co., Ltd.) using an FM mixer (Nippon Coke & Engineering Co., Ltd.) to attach the silica particles to toner particle 1. This was followed by sieving on a 300 mesh (aperture=48 μm) to yield toner 1.

Production of Toners 2 to 9, 11 to 14, and 17 to 19

Toners 2 to 9, 11 to 14, and 17 to 19 were obtained by the same production method as used for toner 1, but with the changes shown in Table 3.

Toner 10 Production

Toner Particle 10 Production

An aqueous medium in a flask was adjusted to pH 4 by the addition of dilute hydrochloric acid to 250.0 parts of deionized water heated to a temperature of 30° C.

1.25 parts of a hexamethylolmelamine prepolymer ("Milben 607", solids concentration=80.0 mass %, Showa Denko Kabushiki Kaisha) was then added and the hexamethylolmelamine prepolymer was dissolved in the aqueous medium by stirring.

100.0 parts of core particle 1 was then added to the aqueous medium and a shell layer was formed on the core particle surface by raising the temperature to 70° C. at a rate of 1° C./min and holding for 2 hours, all while stirring. After cooling to room temperature, filtration, washing with water, and drying yielded a toner particle 10 having a core-shell structure and having a weight-average particle diameter (D4) of 6.8 μm.

Toner 10 Production 100.0 parts of toner particle 10 was mixed for 3 minutes with 1.5 parts of dry silica particles ("AEROSIL (registered trademark) REA90", positive-charging hydrophobed silica particles, Nippon Aerosil Co., Ltd.) using an FM mixer (Nippon Coke & Engineering Co., Ltd.) to attach the silica particles to toner particle 10. This was followed by sieving on a 300 mesh (aperture=48 μm) to yield toner 10.

Toner 15 Production

Preparation of Polyester Resin Particle Dispersion

| | |
|---|---|
| polyester resin 1 | 200.0 parts |
| deionized water | 500.0 parts |

These materials were introduced into a stainless steel vessel; heating to 95° C. and melting were carried out on a hot bath; and, while thoroughly stirring at 7,800 rpm using a homogenizer (Ultra-Turrax T50, IKA), the pH was brought to above 7.0 by the addition of 0.1 mol/L sodium bicarbonate. A polyester resin particle dispersion was then obtained by the gradual dropwise addition of a mixed solution of 3.0 parts of sodium dodecylbenzenesulfonate and 297.0 parts of deionized water while emulsifying and dispersing.

When the particle size distribution of this polyester resin particle dispersion was measured using a particle size distribution analyzer (LA-920, Horiba, Ltd.), the weight-average particle diameter of the contained polyester resin particles was 0.25 μm and coarse particles exceeding 1 μm were not observed.

Preparation of Styrene-Acrylic Resin Particle Dispersion

| | |
|---|---|
| styrene-acrylic resin for the core resin | 200.0 parts |
| deionized water | 500.0 parts |

These materials were introduced into a stainless steel vessel; heating to 95° C. and melting were carried out on a hot bath; and, while thoroughly stirring at 7,800 rpm using a homogenizer (Ultra-Turrax T50, IKA), the pH was brought to above 7.0 by the addition of 0.1 mol/L sodium bicarbonate. A styrene-acrylic resin particle dispersion was then obtained by the gradual dropwise addition of a mixed solution of 3.0 parts of sodium dodecylbenzenesulfonate and 297.0 parts of deionized water while emulsifying and dispersing.

When the particle size distribution of this styrene-acrylic resin particle dispersion was measured using a particle size distribution analyzer (LA-920, Horiba, Ltd.), the number-average particle diameter of the contained styrene-acrylic resin particles was 0.25 μm and coarse particles exceeding 1 μm were not observed.

Preparation of Wax Particle Dispersion

| | |
|---|---|
| deionized water | 500.0 parts |
| Fischer-Tropsch wax (C105, Sasol Limited, melting point: 105° C.) | 250.0 parts |

These materials were introduced into a stainless steel vessel; heating to 95° C. and melting were carried out on a hot bath; and, while thoroughly stirring at 7,800 rpm using a homogenizer (Ultra-Turrax T50, IKA), the pH was brought to above 7.0 by the addition of 0.1 mol/L sodium bicarbonate. A wax particle dispersion was then obtained by the gradual dropwise addition of a mixed solution of 5.0 parts of sodium dodecylbenzenesulfonate and 245.0 parts of deionized water while emulsifying and dispersing.

When the particle size distribution of this wax particle dispersion was measured using a particle size distribution analyzer (LA-920, Horiba, Ltd.), the number average particle diameter of the contained wax particles was 0.35 μm and coarse particles exceeding 1 μm were not observed.

Preparation of Colorant Particle Dispersion

| C.I. Pigment Blue 15:3 | 100.0 parts |
|---|---|
| sodium dodecylbenzenesulfonate | 5.0 parts |
| deionized water | 400.0 parts |

The preceding were mixed and were then dispersed using a sand grinder mill. When the particle size distribution of the colorant particles contained in this colorant particle dispersion was measured using a particle size distribution analyzer (LA-920, Horiba, Ltd.), the number average particle diameter of the contained colorant particles was 0.2 μm and coarse particles exceeding 1 μm were not observed.

Core Particle 15 Production

| polyester resin particle dispersion | 450.0 parts |
|---|---|
| styrene-acrylic resin particle dispersion | 50.0 parts |
| colorant particle dispersion | 50.0 parts |
| wax particle dispersion | 50.0 parts |
| sodium dodecylbenzenesulfonate | 5.0 parts |

The polyester resin particle dispersion, the styrene-acrylic resin particle dispersion, the wax particle dispersion, and the sodium dodecylbenzenesulfonate were introduced into a reactor (flask with a 1 liter capacity, baffle equipped, anchor impeller) and were mixed to uniformity. The colorant particle dispersion was separately mixed to uniformity in a 500-mL beaker, and this was gradually added to the reactor while stirring to provide a mixed dispersion. While stirring the obtained mixed dispersion, 0.5 parts as solids of an aqueous aluminum sulfate solution was added dropwise to bring about the formation of aggregated particles.

After completion of the dropwise addition, the interior of the system was substituted using nitrogen and holding was carried out for 1 hour at 50° C. and for an additional 1 hour at 55° C.

Heating was then carried out and holding was performed for 30 minutes at 90° C. This was followed by cooling to 63° C. and then holding for 3 hours to form coalesced particles. After the prescribed time had elapsed, cooling was carried out to 40° C. at a ramp down rate of 0.5° C. per minute to obtain a core particle 15 dispersion.

Toner Particle 15 Production 2.0 parts of the shell resin 1 dispersion was added per 100.0 parts as the solids fraction to the core particle 15 dispersion, the temperature was raised to 75° C., and holding was carried out for 2 hours to bring about the formation of a shell layer on the core particle surface. After cooling to room temperature, filtration, washing with water, and drying yielded a toner particle 15 having a core-shell structure and having a weight-average particle diameter (D4) of 6.5

Toner 15 Production 100.0 parts of toner particle 15 was mixed for 3 minutes with 1.5 parts of dry silica particles ("AEROSIL (registered trademark) REA90", positive-charging hydrophobed silica particles, Nippon Aerosil Co., Ltd.) using an FM mixer (Nippon Coke & Engineering Co., Ltd.) to attach the silica particles to toner particle 15. This was followed by sieving on a 300 mesh (aperture=48 μm) to yield toner 15.

Toner 16 Production

Core Particle 16 Production

| polyester resin 1 | 90.0 parts |
|---|---|
| styrene-acrylic resin for the core resin | 10.0 parts |
| C.I. Pigment Blue 15:3 (copper phthalocyanine) | 5.0 parts |
| ester wax (behenyl behenate: melting point = 72° C.) | 15.0 parts |
| Fischer-Tropsch wax (C105, Sasol Limited, melting point: 105° C.) | 2.0 parts |
| methyl ethyl ketone | 100.0 parts |
| ethyl acetate | 100.0 parts |

These materials were dispersed for 3 hours using an attritor (Mitsui Mining & Smelting Co., Ltd.) to obtain a colorant dispersion.

Otherwise, an aqueous medium was prepared by adding 1.8 parts of tricalcium phosphate to 300.0 parts of deionized water heated to a temperature of 60° C. and stirring at a stirring rate of 10,000 rpm using a TK Homomixer (Tokushu Kika Kogyo Co., Ltd.). The colorant dispersion was introduced into this aqueous medium and colorant particle granulation was performed by stirring, at a temperature of 65° C. in an $N_2$ atmosphere, for 15 minutes at a stirring rate of 12,000 rpm using a TK Homomixer.

The TK Homomixer was changed over to an ordinary propeller stirrer. The stirring rate with the stirrer was held at 150 rpm; the internal temperature was raised to a temperature of 95° C.; and the solvent was removed from the dispersion by holding for 3 hours to prepare a core particle 16 dispersion.

Toner Particle 16 Production 2.0 parts of the shell resin 1 dispersion was added per 100.0 parts as the solids fraction to the core particle 16 dispersion, the temperature was raised to 75° C., and holding was carried out for 2 hours to bring about the formation of a shell layer on the core particle surface. After cooling to room temperature, the calcium phosphate dispersant was dissolved by the addition of hydrochloric acid, and filtration, washing with water, and drying then gave a toner particle 16 having a core-shell structure and having a weight-average particle diameter (D4) of 6.9 μm.

Toner 16 Production 100.0 parts of toner particle 16 was mixed for 3 minutes with 1.5 parts of dry silica particles ("AEROSIL (registered trademark) REA90", positive-charging hydrophobed silica particles, Nippon Aerosil Co., Ltd.) using an FM mixer (Nippon Coke & Engineering Co., Ltd.) to attach the silica particles to toner particle 16. This was followed by sieving on a 300 mesh (aperture=48 μm) to yield toner 16.

TABLE 3

| | Core resin | | | | Shell | |
|---|---|---|---|---|---|---|
| | Core resin 1 | Parts | Core resin 2 | Parts | Shell resin | Parts |
| Toner 1 | polyester resin 1 | 90.0 | styrene-acrylic resin | 10.0 | shell resin 1 | 1.0 |
| Toner 2 | polyester resin 1 | 60.0 | styrene-acrylic resin | 40.0 | shell resin 1 | 1.0 |
| Toner 3 | polyester resin 1 | 52.0 | styrene-acrylic resin | 48.0 | shell resin 1 | 1.0 |
| Toner 4 | polyester resin 2 | 60.0 | styrene-acrylic resin | 40.0 | shell resin 1 | 1.0 |

TABLE 3-continued

|  | Core resin | | | | Shell | |
| --- | --- | --- | --- | --- | --- | --- |
|  | Core resin 1 | Parts | Core resin 2 | Parts | Shell resin | Parts |
| Toner 5 | polyester resin 3 | 60.0 | styrene-acrylic resin | 40.0 | shell resin 1 | 1.0 |
| Toner 6 | polyester resin 4 | 60.0 | styrene-acrylic resin | 40.0 | shell resin 1 | 1.0 |
| Toner 7 | polyester resin 5 | 60.0 | styrene-acrylic resin | 40.0 | shell resin 1 | 1.0 |
| Toner 8 | polyester resin 6 | 60.0 | styrene-acrylic resin | 40.0 | shell resin 1 | 1.0 |
| Toner 9 | polyester resin 7 | 60.0 | styrene-acrylic resin | 40.0 | shell resin 1 | 1.0 |
| Toner 10 | polyester resin 1 | 60.0 | styrene-acrylic resin | 40.0 | melamine resin | 1.0 |
| Toner 11 | polyester resin 1 | 60.0 | styrene-acrylic resin | 40.0 | shell resin 2 | 1.0 |
| Toner 12 | polyester resin 1 | 60.0 | styrene-acrylic resin | 40.0 | shell resin 3 | 1.0 |
| Toner 13 | polyester resin 1 | 60.0 | styrene-acrylic resin | 40.0 | shell resin 4 | 1.0 |
| Toner 14 | polyester resin 1 | 60.0 | styrene-acrylic resin | 40.0 | shell resin 5 | 1.0 |
| Toner 15 | polyester resin 1 | 90.0 | styrene-acrylic resin | 10.0 | shell resin 1 | 1.0 |
| Toner 16 | polyester resin 1 | 90.0 | styrene-acrylic resin | 10.0 | shell resin 1 | 1.0 |
| Toner 17 | polyester resin 8 | 90.0 | styrene-acrylic resin | 10.0 | shell resin 1 | 1.0 |
| Toner 18 | polyester resin 1 | 50.0 | styrene-acrylic resin | 50.0 | shell resin 1 | 1.0 |
| Toner 19 | polyester resin 1 | 90.0 | styrene-acrylic resin | 10.0 | shell resin 6 | 1.0 |

Image Evaluations

Image evaluations were performed using an "FS-05250DN", a commercial color laser printer from Kyocera Document Solutions Inc., which had been partially modified. The modifications included enabling operation with a process cartridge installed for just a single color. Another modification enabled the fixing unit to be set to a freely selected temperature. A two-component developer prepared by the following method was introduced into the development section of the test machine, toner was introduced into the toner container of the test machine, and the following image evaluations were performed.

Preparation of Two-Component Developer

A two-component developer was prepared by mixing 10 parts of the toner undergoing evaluation with 100 parts of a developer carrier (carrier for the FS-05250DN) for 30 minutes using a ball mill.

The specific image evaluations are as follows.

Fogging

Operating in a low-temperature, low-humidity environment (15° C., 10% RH) or a high-temperature, high-humidity environment (temperature of 32° C./humidity of 85% RH), the reflectance (%) was measured using a "Reflectometer Model TC-6DS" (Tokyo Denshoku Co., Ltd.) on a non-image area both initially and after the completion of a 30,000-print print-out test of a horizontal line image having a 1% image coverage.

The evaluation was performed using the numerical value (%) provided by subtracting the obtained reflectance from the similarly measured reflectance (%) of the unused print-out paper (reference paper). A smaller numerical value is indicative of a greater suppression of image fogging. The evaluation was performed using plain paper (HP Brochure Paper 200 g, Glossy, Hewlett-Packard, 200 g/m²) in glossy paper mode.

Evaluation Criteria
  A: less than 0.5%
  B: at least 0.5% and less than 1.5%
  C: at least 1.5% and less than 3.0%
  D: at least 3.0%

Streak (Developing Performance)

Operating in a high-temperature, high-humidity environment (temperature 32° C./humidity 85% RH), a 30,000-print print-out test was carried out using a horizontal line image having image coverage of 1%. After the completion of this test, a halftone (toner laid-on level: 0.3 mg/cm²) image was printed out on letter-size XEROX 4200 paper (75 g/m², Xerox Corporation). The presence/absence of vertical streaks in the halftone image in the paper discharge direction was scored and the developing performance was evaluated as follows.

Evaluation Criteria
  A: no production
  B: vertical streaks in the paper discharge direction are produced at from 1 to 3 locations in the halftone image
  C: vertical streaks in the paper discharge direction are produced at from 4 to 6 locations in the halftone image
  D: vertical streaks in the paper discharge direction are produced at at least 7 locations in the halftone image, or a vertical streak with a width of at least 0.5 mm is produced Fixing Performance A solid image (toner laid-on level: 0.9 mg/cm²) was printed on the transfer material at different fixation temperatures and evaluation was carried out using the criteria given below. This fixation temperature is the value measured for the fixing roller surface using a noncontact thermometer. Letter-size plain paper (XEROX 4200, 75 g/m², Xerox Corporation) was used for the transfer material.

Evaluation Criteria
  A: offset is not produced at 140° C.
  B: offset is produced at 140° C.
  C: offset is produced at 150° C.
  D: offset is produced at 160° C.

Blocking (Storage Stability)

5 g of each particular toner was placed in a 50-mL plastic cup; this was allowed to stand for 3 days at temperature=60° C./humidity=10% RH; and the presence/absence of cohesion clusters was then checked and was evaluated using the following criteria.

Evaluation Criteria
  A: cohesion clusters are not produced
  B: slight cohesion cluster is produced and is broken up by lightly pressing with a finger
  C: cohesion clusters are produced and are not broken up even by lightly pressing with a finger
  D: complete cohesion Examples 1 to 16

The evaluations indicated above were performed in Examples 1 to 16 respectively using each of toners 1 to 16 for the toner. The results of the evaluations are given in Table 4.

Comparative Examples 1 to 3

The evaluations indicated above were performed in Comparative Examples 1 to 3 respectively using each of toners 17 to 19 for the toner. The results of the evaluations are given in Table 4.

TABLE 4

| | | Fogging | | | | | | |
|---|---|---|---|---|---|---|---|---|
| | | Low-temperature, low humidity | | High-temperature, high-humidity | | | | Fixing |
| | | Initial | After 30,000 prints | Initial | After 30,000 prints | Streak | Storage stability | performance |
| Example 1 | Toner 1 | A(0.1) | A(0.2) | A(0.2) | A(0.3) | A | A | A |
| Example 2 | Toner 2 | A(0.2) | A(0.2) | A(0.3) | A(0.3) | A | A | A |
| Example 3 | Toner 3 | A(0.2) | B(1.2) | A(0.3) | B(1.4) | B | A | A |
| Example 4 | Toner 4 | A(0.2) | B(1.0) | A(0.3) | A(0.3) | B | A | A |
| Example 5 | Toner 5 | A(0.2) | C(1.8) | A(0.3) | C(2.0) | C | B | A |
| Example 6 | Toner 6 | A(0.2) | A(0.3) | A(0.3) | A(0.4) | A | A | A |
| Example 7 | Toner 7 | A(0.2) | A(0.3) | A(0.3) | A(0.4) | A | A | C |
| Example 8 | Toner 8 | B(0.8) | A(0.3) | B(1.2) | A(0.4) | A | A | A |
| Example 9 | Toner 9 | B(0.8) | A(0.3) | B(1.2) | A(0.4) | A | A | C |
| Example 10 | Toner 10 | A(0.2) | A(0.2) | B(1.4) | B(1.4) | A | A | B |
| Example 11 | Toner 11 | A(0.2) | A(0.2) | A(0.3) | A(0.3) | A | A | A |
| Example 12 | Toner 12 | A(0.4) | C(1.8) | A(0.4) | B(1.4) | C | B | A |
| Example 13 | Toner 13 | A(0.1) | A(0.2) | A(0.2) | A(0.2) | A | A | A |
| Example 14 | Toner 14 | A(0.2) | A(0.3) | B(1.1) | C(1.5) | A | A | A |
| Example 15 | Toner 15 | A(0.2) | A(0.3) | A(0.3) | A(0.4) | A | A | A |
| Example 16 | Toner 16 | A(0.2) | A(0.2) | A(0.3) | A(0.3) | A | A | A |
| Comparative Example 1 | Toner 17 | A(0.2) | D(3.5) | A(0.4) | D(4.1) | D | B | A |
| Comparative Example 2 | Toner 18 | A(0.2) | D(3.1) | A(0.3) | D(3.3) | C | A | A |
| Comparative Example 3 | Toner 19 | A(0.2) | D(3.4) | A(0.3) | D(3.8) | D | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-053059, filed Mar. 24, 2020, which is hereby incorporated by reference herein in its entirety.

What is claimed is:

1. A toner comprising a toner particle, the toner particle comprising:
  a core particle containing a resin component, the resin component comprising a styrene-acrylic resin and more than 50.0 mass % of a polyester resin comprising an isosorbide monomer unit; and
  a shell on a surface of the core particle, the shell comprising at least one resin selected from the group consisting of (i) melamine resins and (ii) (meth)acrylic resins comprising at least one monomer unit selected from the group consisting of a monomer unit represented by formula (2) and a 2-hydroxyethyl methacrylate monomer unit

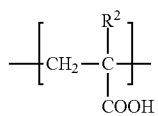

(2)

where $R^2$ represents a hydrogen atom or a methyl group, wherein
the shell content is 0.7 to 2.5 mass parts per 100.0 mass parts of the resin component in the core particle, and
the toner particle is a particle obtained by forming the shell on the surface of the core particle in an aqueous medium in which the core particle is dispersed.

2. The toner according to claim 1, wherein a content of the isosorbide monomer unit in the polyester resin is 5.0 to 35.0 mass %.

3. The toner according to claim 1, wherein the polyester resin comprises at least one member selected from the group consisting of a structure in which an aliphatic diol is condensation-polymerized with a carboxylic acid component and a structure in which an alicyclic diol is condensation-polymerized with a carboxylic acid component.

4. The toner according to claim 1, wherein the shell comprises the (meth)acrylic resin.

5. The toner according to claim 4, wherein a total content of the monomer unit selected from the group consisting of monomer unit represented by formula (2) and the 2-hydroxyethyl methacrylate monomer unit in the (meth)acrylic resin is 5.0 to 35.0 mass %.

6. A method for producing a toner comprising a toner particle, comprising a step of:
  forming a shell on a surface of a core particle in an aqueous medium in which the core particle is dispersed, wherein
  the core particle contains a resin component, the resin component comprising a styrene-acrylic resin and more than 50.0 mass % of a polyester resin comprising an isosorbide monomer unit,
  the shell comprises at least one resin selected from the group consisting of (i) melamine resins and (ii) (meth)acrylic resins comprising at least one monomer unit selected from the group consisting of a monomer unit represented by formula (2) and a 2-hydroxyethyl methacrylate monomer unit

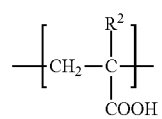

(2)

where $R^2$ represents a hydrogen atom or a methyl group, and the shell content is from 0.7 to 2.5 mass parts per 100.0 mass parts of the resin component in the core particle.

* * * * *